United States Patent [19]

Yamamoto et al.

[11] Patent Number: 4,842,957

[45] Date of Patent: Jun. 27, 1989

[54] PRESSURE SENSOR ELEMENT

[75] Inventors: Tetsuo Yamamoto; Hiroshi Hayashi; Tenshiro Muta, all of Nagoya; Yoshisada Hori, Ichinomiya; Katsushi Kubo, Nagoya, all of Japan

[73] Assignees: Agency of Industrial Science & Technology; Ministry of International Trade & Industry, both of Tokyo, Japan

[21] Appl. No.: 113,917

[22] Filed: Oct. 29, 1987

[30] Foreign Application Priority Data

Nov. 8, 1986 [JP] Japan ................................ 61-266358

[51] Int. Cl.$^4$ ................................................ G01L 9/04
[52] U.S. Cl. ...................................... 428/622; 428/627; 428/632; 428/457; 73/754; 73/DIG. 4
[58] Field of Search ............... 428/457, 469, 673, 622, 428/627, 632; 73/753, 754, DIG. 4

[56] References Cited

U.S. PATENT DOCUMENTS

| | | | |
|---|---|---|---|
| 3,463,663 | 8/1969 | Chopra | 428/469 |
| 4,050,956 | 9/1977 | De Bruin et al. | 428/457 |
| 4,414,281 | 11/1983 | Hoda | 428/469 |
| 4,667,518 | 5/1987 | Iden | 73/753 |

Primary Examiner—Melvyn J. Andrews
Assistant Examiner—George Wyszomierski
Attorney, Agent, or Firm—Oblon, Spivak, McClelland, Maier & Neustadt

[57] ABSTRACT

A pressure sensor element is disclosed which essentially comprises a high-strength electric insulating ceramic substrate and a silver coating tightly deposited on the surface of the substrate. When a region of the element is subjected to a high pressure, the electric resistance in the region concerned changes in proportion to the magnitude of the pressure.

4 Claims, 1 Drawing Sheet

PRESSURE SENSOR ELEMENT

BACKGROUND OF THE INVENTION

1. Field of the Invention

This invention relates to a novel pressure sensor element which possesses the characteristic of varying in electric resistance in proportion to the magnitude of the pressure exerted thereon and is, therefore, suitable for use in the measurement of pressure in a region of high pressure.

2. Prior Art Statement

Heretofore, as instruments for the measurement of high pressure, the free-piston gauge intended as a primary pressure gauge, and the Bourdon-tube gauge and the manganin pressure gauge intended as secondary pressure gauges have been generally known.

Once the Bourdon-tube gauge is exposed to pressure of a magnitude falling above a fixed range of measurement, it is apt to cease displaying accurate measurement results or to suffer mechanical destruction. In contrast, the manganin pressure gauge has low susceptibility to these problems and, or this reason, has found wide utility. The manganin pressure gauge, however, is not necessarily easy to manufacture because the structure thereof necessitates seasoning of the manganin resistance wire.

In recent years, various automatic control systems have been developed. Most of these systems involve measurement of pressure. For the purpose of this use, it is desirable that the magnitude of the pressure be readily converted into that of electric resistance.

Where a pressure gauge is to be miniaturized enough to be conveniently incorporated in an automatic control system, the manganin pressure gauge is unsatisfactory in many points regarding dimensions of the element, magnitude of the resistance, and the rated electric power.

OBJECT AND SUMMARY OF THE INVENTION

An object of this invention is to provide a pressure sensor element which is sturdy and can be safely used for a long time, simple to manufacture, compact for convenient incorporation in the automatic control system, and able to display numerical values of electric resistance faithfully representing changing magnitudes of pressure.

To accomplish the object described above according to the present invention, there is provided a pressure sensor element which essentially comprises a high-pressure electric insulating ceramic substrate and a silver coating tightly deposited on the surface of the substrate.

DETAILED DESCRIPTION OF THE PREFERRED EMBODIMENTS

As examples of the insulating ceramic substance to be used as the substrate in the pressure sensor element, there can be cited sintered alumina, sintered magnesia, sintered zirconia, sintered silicon nitride, sintered silicon carbide, and sintered spinels of the general formula, $MO \cdot R_2O_3$ (wherein $M=Mg$, Zn, Co, Ni, or Fe and $R=Fe$, Al, or Ca). In the insulating ceramic substances enumerated above, those which possess compressive strength of not less than 50 kg/mm$^2$ prove to be particularly desirable. The substrate of the insulating ceramic substance described above is used as molded in any desired shape such as, for example, the shape of a bar, a plate, a tube, or an angular column.

Typical optimum dimensions of the substrate by the shape are shown below.

Substrate in the shape of a bar: 3 to 5 mm in diameter and 10 to 15 mm in length Substrate in the shape of a plate: 20 mm in length, 10 mm in width, and 0.8 mm in thickness Substrate in the shape of a tube: 3 to 5 mm in outside diameter, 1 to 3 mm in inside diameter, and 10 to 15 mm in length Substrate in the shape of an angular column: 3 to 5 mm in the side of square cross-sectional area and 10 to 15 mm in length The pressure sensor element of the present invention is obtained by forming a silver coating on the surface of the aforementioned substrate. This formation of the silver coating can be accomplished by any of the conventional methods generally adopted for the formation of a metallic coating. Examples of the method usable for this purpose include metallizing plating method, vacuum deposition method, and chemical vacuum deposition method.

The smallest permissible thickness of the silver coating in the practicable pressure sensor element is about 0.01 $\mu$m. The silver coating is not allowed to possess a very large thickness. The largest permissible thickness of the silver coating is about 15 $\mu$m.

Figure 1:
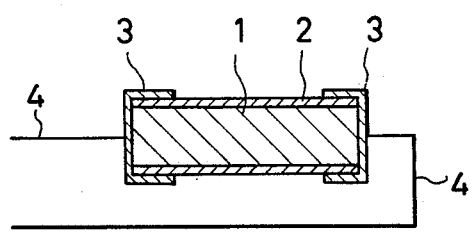
FIG. 1 is a cross section illustrating a typical construction of the sensor element of the present invention.

Now, the present invention will be described below with reference to FIG. 1, which illustrates a typical construction of the pressure sensor element of this invention.

In the diagram, 1 denotes a ceramic rod and 2 a silver coating deposited tightly on the surface of the ceramic rod. To the opposite ends of the rod 1, lead wires 4 are connected through the medium of metallic caps 3 as illustrated. These lead wires 4 are connected to a converter adapted for conversion of variation of resistance to variation of voltage.

The silver coating is not necessarily required to cover the whole surface of the ceramic substrate. In the case of a ceramic substrate in the shape of an angular column, for example, the silver coating may be formed to cover only one of the plurality of lateral surfaces.

When the pressure sensor element of this invention connected to an instrument such as the electrical resistance meter is installed inside a liquid pressure container, a rise of liquid pressure inside the container produces a corresponding variation of the magnitude of electric resistance of the pressure sensor element.

The inventors formerly continued various studies in search for a way of effecting noncontacting measurement of high pressure and developed an automatic pressure measuring system making use of the polarity of a laser beam. This system comprises a unit for detecting the magnitude of pressure, a unit for converting the magnitude of pressure into that of optical factor, and a computer for processing the magnitude of optical factor corresponding to the magnitude of pressure. The pressure sensor element of this invention serves optimally as a pressure detector in the aforementioned system for detecting the magnitude of pressure.

The pressure sensor element of the present invention is capable of measuring high pressure on the order of 5,000 kgf/cm² or over.

The pressure sensor element of this invention permits safe and accurate measurement of the magnitude of high pressure for a long time because it has high electric resistance, high mechanical strength, and high rated electric power and is affected only slightly by temperature.

Now, the present invention will be described more specifically below with reference to working examples.

EXAMPLE 1

Figure 2:
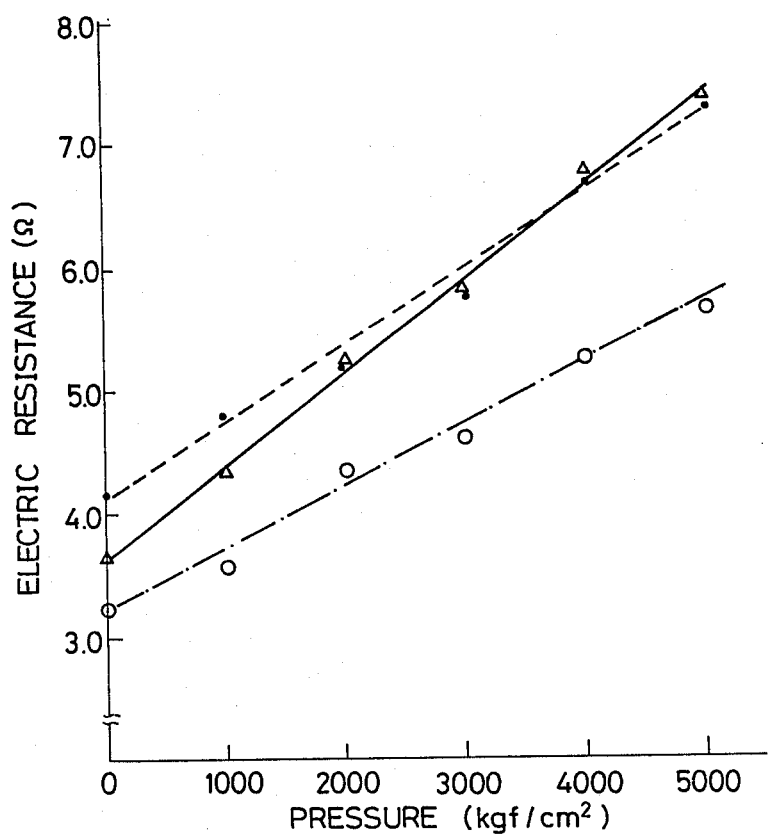
FIG. 2 is a graph showing the relations between the applied pressure and the electric resistance obtained of the sensor elements of the present invention described in Examples 1, 2 and 3.

A pressure sensor element was produced by forming a bar of sintered alumina 3 mm in diameter and 10 mm in length and depositing a firmly adhering silver coating 3 μm in thickness on the lateral surface of the bar by the chemical deposition method. This element, with metallic caps fitted on the opposite ends thereof, was connected to an electrical resistance meter with lead wires as illustrated in FIG. 1. The element so furnished was installed inside a pressure container filled with a mixed liquid (226.5 Cst at 27° C.) consisting of vegetable oil and alcohol and operated under different liquid pressures to measure consequent variation of electrical resistance. The results of the measurement are indicated by a solid line in FIG. 2.

EXAMPLE 2

A pressure sensor element was produced by faithfully following the procedure of Example 1, except that the thickness of the silver coating was changed to 4 μm.

This pressure sensor element was used to determine the relation between the liquid pressure and the electrical pressure in the same apparatus as in Example 1. The results are indicated by a broken line in FIG. 2.

EXAMPLE 3

A pressure sensor element was produced by forming a rectangular column of sintered silicon nitride 3 mm×4 mm in sectional area and 10 mm in length and depositing a firmly adhering silver coating 6 μm in thickness on the lateral surfaces of the column by the metallizing plating method. This element was used to determine the relation between the liquid pressure and the electric resistance in the same apparatus as in Example 1. The results are indicated by an alternate one long and one short dash line in FIG. 2.

As clearly noted from the results indicated above, the pressure sensor element of the present invention possesses a linear relation between the applied liquid pressure and the generated electrical resistance and suits the measurement of pressure.

What is claimed is:

1. A pressure sensor element, consisting of a high-strength electrically insulating ceramic substrate, a firmly adhering silver coating deposited on the surface of said substrate, and electroconductive grounding metallic caps disposed one on each of the opposite ends of said ceramic substrate possessing the firmly adhering deposited silver coating and in conductive contact with the silver coating, which pressure sensor element, upon being placed in a liquid, manifests changes in liquid pressure exerted thereon by proportionate changes in the resistance of electric current flowing through the sensor element.

2. The pressure sensor element according to claim 1, wherein said ceramic substrate comprises at least one ceramic substance selected from the group consisting of sintered alumina, sintered magnesia, sintered zirconia, sintered silicon nitride, sintered silicon carbide and sintered spinels.

3. The pressure sensor element according to claim 2, wherein said ceramic substrate possesses a compressive strength of at least 50 kg/mm².

4. The pressure sensor element according to claim 1, wherein said silver coating has a thickness ranging from 0.01 to 15 μm.

* * * * *